United States Patent [19]

Dickert et al.

[11] 4,132,831

[45] Jan. 2, 1979

[54] LAMINATES HAVING A LINEAR, ACYLATED POLYALKYLENEPOLYAMINE INTERMEDIATE BINDING LAYER AND A METHOD OF PREPARATION

[75] Inventors: Yancey J. Dickert, Midland; Anthony M. DeRoo, Sanford, both of Mich.

[73] Assignee: The Dow Chemical Company, Midland, Mich.

[21] Appl. No.: 775,341

[22] Filed: Mar. 7, 1977

[51] Int. Cl.$^2$ .................. B32B 15/08; B32B 27/06; C09J 3/02
[52] U.S. Cl. ................................. 428/458; 156/331; 428/475; 428/474; 428/480; 528/403; 528/404
[58] Field of Search ............... 428/458, 476, 474, 475, 428/514, 479, 435, 480, 421, 510; 156/331; 260/2 R, 18 R

[56] References Cited

U.S. PATENT DOCUMENTS

| 3,033,707 | 5/1962 | Lacy et al. | 428/215 |
|---|---|---|---|
| 3,230,135 | 1/1966 | Hurst | 428/342 |
| 3,471,359 | 10/1969 | Goldstein | 156/331 X |

Primary Examiner—William R. Dixon, Jr.
Attorney, Agent, or Firm—G. R. Plotecher

[57] ABSTRACT

Novel laminates are prepared by a process comprising applying to a surface of a first substrate a binding amount of a linear, acylated polyalkylenepolyamine having a weight average molecular weight of at least about 10,000 as an intermediate binding layer and subsequently applying to the layer a surface of a second substrate. For example, polyethylene film is bonded to paper by an intermediate binding layer of poly(N-propionyl)ethylenimine.

27 Claims, No Drawings

LAMINATES HAVING A LINEAR, ACYLATED POLYALKYLENEPOLYAMINE INTERMEDIATE BINDING LAYER AND A METHOD OF PREPARATION

BACKGROUND OF THE INVENTION

1. Field of the Invention

This invention relates to laminates. In one aspect, the invention relates to laminates having an intermediate binding layer of polyalkylenepolyamine. In another aspect, the invention relates to a method of preparing these laminates.

2. Description of the Prior Art

Branched chain polyethylenimine (PEI), as exemplified in I, has long been an art-recognized intermediate binding layer for various laminates.

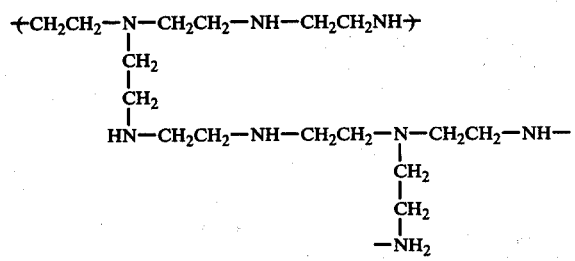

Illustrative teachings include: Lacy et al., USP 3,140,196 (non-aromatic polyolefin or vinylidene chloride and vinyl chloride copolymer film laminated to various metal foils); Lacy et al., U.S. Pat. No. 3,033,707 (non-aromatic polyolefin film bonded to vinylidene chloride and vinyl chloride copolymer-coated cellophane); Newmaker, U.S. Pat. No. 3,096,602 (non-aromatic polyolefin film bonded to a nonregenerated cellulose base); and Br. 919,065 and Hurst U.S. Pat. No. 3,230,135 (non-aromatic polyolefin film bonded to paper and paperboard).

PEI has a wide variety of amine functionality and is thus cationic in character. As such, PEI has a high affinity for various anionically charged substrates, e.g., cellulose, glass, various metals and the like. This affinity for anionic sites is a major property leading to its utility as a laminate adhesive. Accordingly, it has generally been thought that compounds without this wide variety of amine functionality would have little, if any, utility as laminate adhesives.

SUMMARY OF THE INVENTION

Novel and useful laminates are now prepared by a method comprising applying to a surface of a first substrate a binding amount of a linear, acylated polyalkylenepolyamine having a weight average molecular weight of at least about 10,000 as an intermediate binding layer and subsequently applying to the layer a surface of a second substrate. The polyalkylenepolyamine of this invention is a linear polyamide and has excellent bonding strength. Although a wide variety of new and useful laminates are possible, laminates comprising a polyolefin film bonded to a regenerated cellulose substrate are particularly adaptable to this invention. Such laminates find a plurality of utility in the wrapping and packaging arts.

DETAILED DESCRIPTION OF THE INVENTION

Polyalkylenepolyamines are known compounds consisting essentially of n units (II, III), randomly joined, and are readily prepared by the ring-opening polymerization of substituted oxazolines or like compounds (IV), followed optionally by hydrolysis.

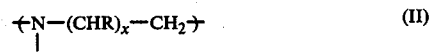

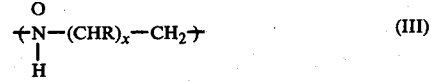

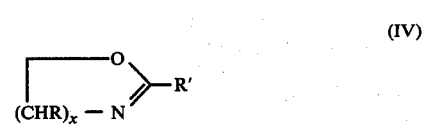

The substituents and subscript are hereinafter defined. The ring-opening polymerization is generally conducted in the presence of a cationic polymerization catalyst at a reaction temperature of about 0°–200° C. Typical catalysts include strong mineral acids, organic sulfonic acids and their esters, acidic salts such as ammonium sulfate, Lewis acids such as aluminum trichloride, stannous tetrachloride, boron trifluoride, and organic diazoniumfluoroborates dialkylsulfates, and other like catalysts. This ring-opening polymerization is further described by Tomalia et al., *J. Polymer Science*, 4, 2253 (1966); Bassiri et al., *Polymer Letters*, 5, 871 (1967); and Seeliger, Ger. 1,206,585.

The pre-hydrolyzed polymers thereby obtained are linear, N-acylated polyalkylenepolyamines having a molecular structure consisting essentially of repeating units II. These polymers are easily deacylated by acid, base or neutral hydrolysis. Hydrolysis (deacylation) is best controlled under acidic conditions and acid hydrolysis is thus preferred. The partially deacylated polyalkylenepolyamines have a molecular structure consisting essentially of the randomly joined units II and III, illustratively depicted as

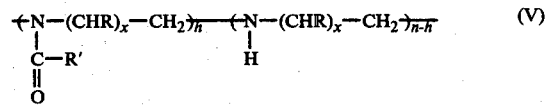

wherein:
n is the total number of units;
h is the number of acylated units; and
n–h is the number of deacylated units.

"Acylated polyalkylenepolyamines" here includes both the fully and partially acylated polymers. Partially acylated polyalkylenepolyamines have at least one acyl group (R'C=O) per polymer chain, i.e., h is at least one. Preferably, the polyalkylenepolyamines here used are at least about 50 percent acylated (h is at least about 50 percent of n) and most preferably at least about 75 percent acylated (h is at least about 75 percent of n). Fully acylated polyalkylenepolyamines (h is or is about 100 percent of n) are most preferred.

As regards the substituents and subscript in the above formulae, R is typically hydrogen or $C_1$-$C_3$ alkyl, R' is typically alkyl having up to about 18 carbon atoms or an inertly-substituted derivative thereof, and x is 1 or 2. By such terms as "inertly-substituted" is meant that the substituents do not render the polyalkylenepolyamine nonbinding. Illustrative inert substituents include halogen, ethylenic unsaturation, ether oxygen, carbonyl, ester, etc. Exemplary R substituents include hydrogen, methyl, ethyl and propyl and exemplary R' substituents include methyl, ethyl, propyl, pentyl, cyclohexyl, dodecyl, octadecyl, and the various halogenated, ethylenically unsaturated, etc., derivatives thereof. Polyethylenimines (x is 1) wherein R is hydrogen and R' is an alkyl radical of 1-4 carbon atoms are preferred. Poly(N-propionyl)and poly(N-butionyl)ethylenimine are most preferred.

Polyalkylenepolyamines having a weight average molecular weight of at least about 10,000, as determined by gel permeation chromatography, are used in the practice of this invention. Typically these compounds have an average minimum molecular weight of about 20,000 and preferably of about 100,000. Practical considerations, such as preparation, mechanical application, and the like are the only limitations upon these compounds' average maximum molecular weight although convenience prefers a maximum of about 600,000.

All substrates that can be bound into a laminate by a PEI intermediate binding layer can be bound into a laminate by the linear, acylated polyalkylenepolyamines of this invention. The substrates can be similar or dissimilar and include a wide variety of materials, such as aluminum foil, polyester and polyolefin films having either or both aromatic or non-aromatic components, regenerated cellulose, regenerated cellulose coated with either nitrocellulose or a copolymer of vinylidene chloride and vinyl chloride, cellulose acetate, ethylcellulose, copolymers of vinylidene chloride and vinyl chloride, glass, various metals, wood, and the like. These polyalkylenepolyamines find particular utility as a tie-coat adhesive, i.e., binding a film to another, dissimilar substrate such as those aforementioned. These adhesives are especially useful for tying polyolefin films, such as polyethylene, polypropylene, etc., to substrates of regenerated cellulose.

A binding amount of polyalkylenepolyamine is necessary to form a laminate. By "binding amount" is meant sufficient polyalkylenepolyamine to bind the surfaces of two substrates to one another. Quantitative amounts can only be stated for particular laminates but when these polyalkylenepolyamines are used as tie-coat adhesives, it can generally be stated that at least about 0.002 pounds of solids per 1,000 square feet of substrate surface, and preferably about 0.005 pounds, is a binding amount. Moreover, it can generally be stated that a relatively porous substrate, such as Kraft-pulp paper, requires more polyalkylenepolyamine per square foot of substrate surface than a relatively nonporous substrate, such as glassine paper, to obtain comparable adhesion. Practical limitations, such as economy, etc., are the only limitations on the maximum amount of polyalkylenepolyamine that can be used. The earlier cited patents of Lacy et al., etc., further describe the quantitative aspects of binding amount.

The linear, acylated polyalkylenepolyamines of this invention are used in the same manner as PEI. They can be applied to a substrate surface by rotogravure, flexographic coating, saturated felt, spraying, dipping, brushing, rolling, etc. These materials can be diluted with water, methanol, ethanol, isopropanol, methylene chloride and other conventional solvents or used neat. Drying of a laminate after formation is necessary only to remove solvent. For extrusion application procedures, the polyalkylenepolyamines of this invention can be readily applied at normal extrusion temperatures. Moreover, the polyalkylenepolyamines of this invention are generally less toxic than PEI and thus can be used under production conditions where PEI must be limited because of toxicity considerations.

The following examples are illustrative of certain specific embodiments of this invention. Unless otherwise noted, all parts and percentages are by weight.

SPECIFIC EMBODIMENTS

EXAMPLES 1-5:

To a bleached Kraft paper (50 lb/ream) was applied an aqueous solution (0.25 percent solids) of poly(N-propionyl) ethylenimine (PNPEI), having a weight average molecular weight of about 245,000, at a rate of about 0.01 lb solids/ream (3,000 ft$^2$) using a number 3 wire wound rod (about 0.27 mil wet film thickness). Polyethylene (1 mil thickness) was then applied to the PNPEI-coated paper from an extruder operating at about 610° F. dye temperature. The resulting laminate was passed through a cold roller and collected. The adhesion strength of the laminate was subsequently tested by an Instron Tensile Tester at a crosshead speed of about 5 in/min. The results are tabulated below.

As a control, a laminate (blank) of the polyethylene film and Kraft paper was prepared by the above procedure without a tie-coat adhesive. These results are also tabulated below.

TABLE

| LAMINATE ADHESION STRENGTH, lb/in. | | |
|---|---|---|
| Ex. | Blank | PNPEI |
| 1 | 0.43 | 0.72 |
| 2 | 0.40 | 0.67 |
| 3 | 0.54 | 0.70 |
| 4 | 0.52 | 0.60 |
| 5 | — | 0.74 |
| Average | 0.47 | 0.69 |

The above data demonstrates that PNPEI is an effective laminate adhesive. Moreover, each of the above laminates were visually inspected subsequent to testing by the Instron Tensile Tester and evaluated as regards fiber tear. Each blank laminate exhibited minimal fiber tear while each PNPEI laminate exhibited complete fiber tear, the former being indicative of poor adhesion and the latter being indicative of good adhesion.

Although this invention has been described with specific reference to particular embodiments, it is to be understood that it is not to be limited thereto but it is to be construed commensurate with the disclosure and restricted solely by the scope of the appended claims.

What is claimed is:

1. A method of preparing a laminate, the method comprising applying to a surface of a first substrate a binding amount of a linear, acylated polyalkylenepolyamine having a weight average molecular weight of at least about 10,000 as an intermediate binding layer and subsequently applying to the layer a surface of a second substrate.

2. The method of claim 1 wherein the polyalkylenepolyamine consists essentially of n randomly joined units of the formulae

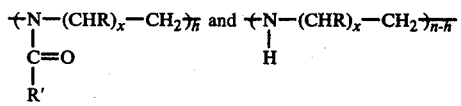

wherein: R is hydrogen or $C_1$-$C_3$ alkyl; R' is alkyl having up to about 18 carbon atoms or an inertly-substituted derivative thereof; x is 1 or 2; n is the total number of randomly joined units; h is the number of acylated units; and n-h is the number of deacylated units, with the proviso that h is at least 1.

3. The method of claim 2 wherein x is 1.

4. The method of claim 3 wherein the polyalkylenepolyamine has a minimum weight average molecular weight of about 20,000.

5. The method of claim 4 wherein the polyalkylenepolyamine has a weight average molecular weight between about 100,000 and about 600,000, inclusive.

6. The method of claim 5 wherein R is hydrogen.

7. The method of claim 6 wherein R' is alkyl of 2 or 3 carbon atoms.

8. The method of claim 7 wherein h is at least about 50 percent of n.

9. The method of claim 7 wherein h is or is about 100 percent of n.

10. The method of claim 9 wherein the second substrate is a film.

11. The method of claim 10 wherein the film comprises a polyolefin.

12. The method of claim 11 wherein the first substrate is regenerated cellulose.

13. The method of claim 11 wherein the film is polyethylene.

14. The method of claim 13 wherein the first substrate is paper.

15. The method of claim 14 wherein the polyethylenepolyamine is applied to the surface of the paper at a rate of at least about 0.002 pounds of solids per 1,000 square feet of surface.

16. The method of claim 10 wherein the first substrate is aluminum foil, polyester film, vinylidene chloride and vinyl chloride copolymer film, regenerated cellulose, ethylcellulose, cellulose acetate, or regenerated cellulose coated with nitrocellulose or vinylidene chloride and vinyl chloride copolymer.

17. A laminate comprising:
(a) a first substrate;
(b) a second substrate; and
(c) a linear, acylated polyalkylenepolyamine having a weight average molecular weight of at least about 10,000 as an intermediate binding layer between the first and second substrates.

18. The laminate of claim 17 wherein the polyalkylenepolyamine consists essentially of n randomly joined units of the formulae

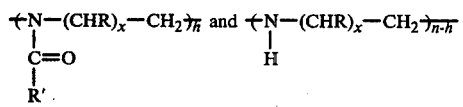

wherein R is hydrogen or $C_1$-$C_3$ alkyl; R' is alkyl having up to about 18 carbon atoms or an inertly-substituted derivative thereof; x is 1 or 2; n is the total number of randomly joined units; h is the number of acylated units; and n-h is the number of deacylated units, with the proviso that h is at least 1.

19. The laminate of claim 18 wherein the polyalkylenepolyamine has a molecular weight between about 100,000 and about 600,000, inclusive.

20. The laminate of claim 19 wherein R is hydrogen, x is 1 and R' is alkyl of 2 or 3 carbon atoms.

21. The laminate of claim 20 wherein h is at least about 50 percent of n.

22. The laminate of claim 20 wherein h is or is about 100 percent of n.

23. The laminate of claim 22 wherein the second substrate is a film.

24. The laminate of claim 23 wherein the film is polyethylene.

25. The laminate of claim 24 wherein the first substrate is aluminum foil, polyester film, vinylidene chloride and vinyl chloride copolymer film, regenerated cellulose, ethylcellulose, cellulose acetate, or a regenerated cellulose coated with nitrocellulose or vinylidene chloride and vinyl chloride copolymer.

26. The laminate of claim 25 wherein the first substrate is regenerated cellulose.

27. The laminate of claim 26 wherein the first substrate is paper.

* * * * *